United States Patent [19]
Padula et al.

[11] 3,917,391
[45] Nov. 4, 1975

[54] PROJECTION SYSTEM FOR MEASURING CURVES AND CROSS-SECTIONAL DIMENSIONS OF HYDROPHILIC CONTACT LENSES

[75] Inventors: Charles F. Padula, Southbridge, Mass.; Larry A. Spitzberg, San Rafael, Calif.; Richard A. Kilborn, Charlton City, Mass.

[73] Assignee: Warner-Lambert Company, Morris Plains, N.J.

[22] Filed: May 2, 1974

[21] Appl. No.: 466,335

[52] U.S. Cl. .................... 353/80; 353/69; 353/102; 356/124; 356/164
[51] Int. Cl.² .......................................... G01B 9/08
[58] Field of Search ........ 353/80, 69, 102; 356/124, 356/164, 165, 166

[56] References Cited
UNITED STATES PATENTS

| | | | |
|---|---|---|---|
| 3,519,358 | 7/1970 | Kuttner | 356/124 |
| 3,822,096 | 7/1974 | Wilms | 356/124 |

FOREIGN PATENTS OR APPLICATIONS

| | | | |
|---|---|---|---|
| 155,511 | 2/1939 | Germany | 353/102 |
| 20,151 | 9/1912 | United Kingdom | 353/102 |
| 608,226 | 4/1926 | France | 353/102 |

*Primary Examiner*—Richard E. Aegerter
*Assistant Examiner*—A. Jason Mirabito
*Attorney, Agent, or Firm*—Albert H. Graddis; Frank S. Chow

[57] ABSTRACT

The contours of a hydrophilic contact lens immersed in saline solution within a transparent cell can be projected to give a clear, accurately measurable cross-sectional image by introducing an additional lens of positive power into the usual condenser lens of a projection system and providing a light diffuser between the transparent cell and the condenser lens system.

1 Claim, 1 Drawing Figure

U.S. Patent Nov. 4, 1975 3,917,391
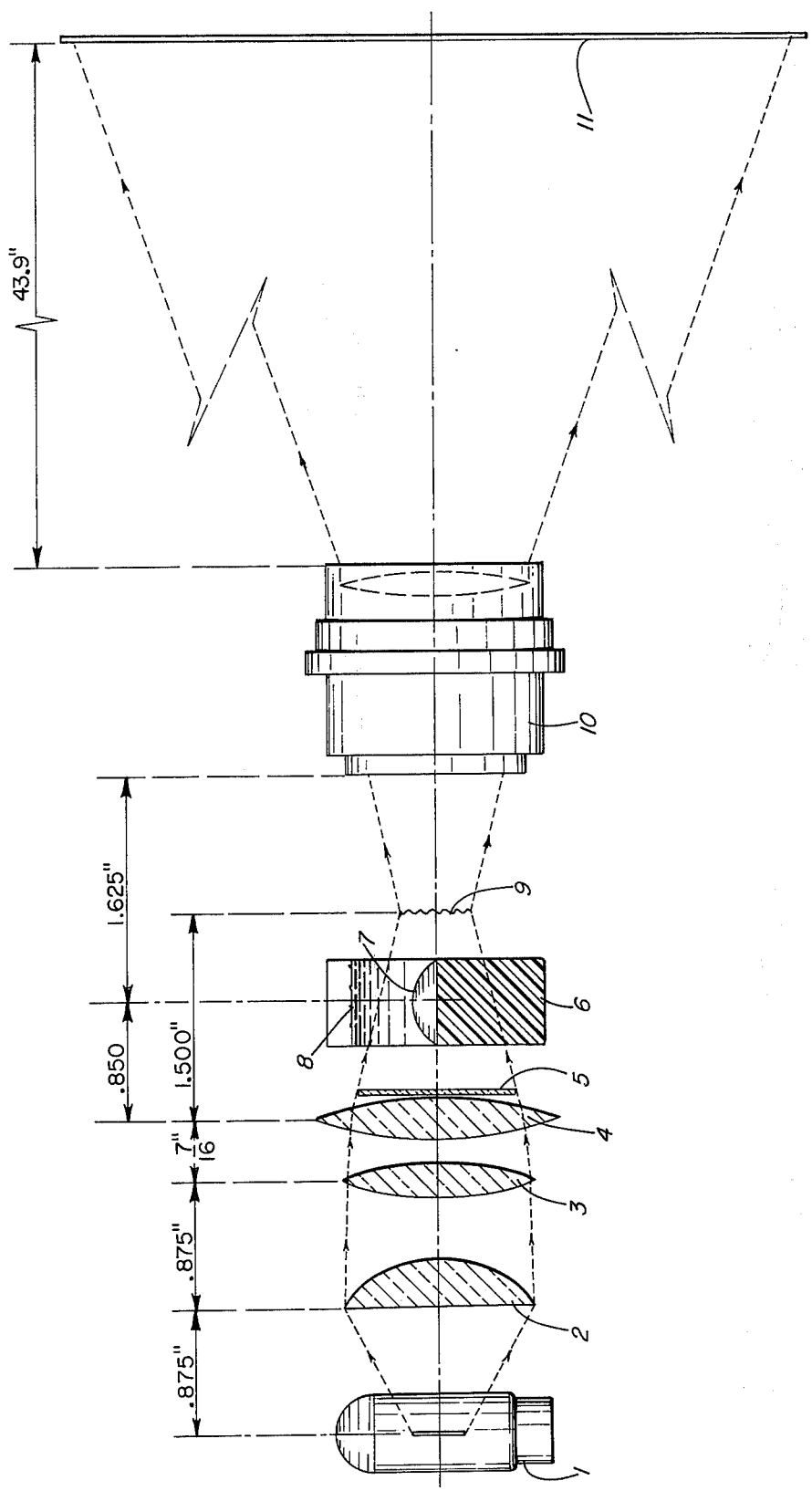

PROJECTION SYSTEM FOR MEASURING CURVES AND CROSS-SECTIONAL DIMENSIONS OF HYDROPHILIC CONTACT LENSES

The present invention relates to an improved projection system which enables one to project on to a screen the cross-sectional image in profile of a hydrophilic contact lens immersed in saline solution in order that the contours of the lens may be accurately measured and the precise thickness, diameter and surface curvatures be determined.

Contact lenses formed of clear plastic materials are in wide use today. These lenses may be formed of a hard plastic material or rigid structure such as polymethyl methacrylate or other polyacrylate. These materials ordinarily remain rigid after being shaped into a lens and exposed to tears in use in spite of the fact that such contact lenses are usually relatively thin and of a diameter only sufficient to cover the cornea. Lenses such as these which are dimensionally stable and which do not absorb any appreciable amount of water are referred to as hydrophobic contact lenses. Another type of contact lens is made of polymeric material which is highly hydrophilic. These lenses, when hydrated, are capable of absorbing up to, and sometimes more than, 50 % by weight of water. While immersed in isotonic saline or bathed by tears, these lenses remain soft and flexible. Such soft contact lenses have also established a firm market position and are widely prescribed in ophthalmic practice.

However, one of the commonly experienced difficulties with soft contact lenses is the inability of the ophthalmologist or optometrist, with the instruments generally available, to determine conveniently and accurately the surface curvature, thickness and diameter of a particular lens as received from the manufacturer. These parameters affect the fit, comfort and visual acuity achievable with the lens. Determination of the posterior base curve radius is of particular importance regarding lens fit and comfort.

The true equilibrium dimensions of a hydrophilic contact lens are achieved only in the fully hydrated state. In this condition supporting the lens in air during a measurement is entirely impractical since it is quite soft and flexible and easily distorted and dehydrated. Any precise dimensional measurement which is to be made must be made while the lens is in equilibrium and immersed in a buoyant medium. This hydration equilibrium requirement, along with the lack of material rigidity, makes it mandatory that measurements be made while the lens is immersed in isotonic saline if they are to be accurate and dependable. Ordinary lensometers, surface curve gages and thickness gages which are useful in obtaining accurate measurements of spectacle lens parameters are quite useless for measuring hydrated, hydrophilic contact lenses.

When several lenses of different powers and dimensions are accidentally commingled, the ability to make correct identification is difficult and often impossible. The solution frequently consists of discarding the commingled lenses and acquiring new lenses correctly identified by the manufacturer. When a lens is lost or damaged, verification of identical lens replacement is also difficult.

One form of instrument which has been suggested as being useful for obtaining the desired measurements is an optical projection system. By using such a projection system, a cross-sectional image of the contact lens can be projected on to a screen. If the projected image is clear and sharp, with dimensions in true proportion, several parameters of the contact lens can readily be measured with acceptable accuracy. However, in the case of soft contact lenses where the measurements are made with the lens immersed in isotonic saline within a transparent cell, a clear image with faithful cross-sectional dimensions is not obtained using the usual image projection system.

It is, therefore, an important object of this invention to provide an improved optical projection system which is particularly useful in producing a clear, sharp cross-sectional image of a transparent contact lens with image dimensions in faithful proportion to those of the contact lens.

Other objects of this invention will appear from the following detailed description and the accompanying drawing.

The drawing is a diagrammatic representation of the improved optical projection system of this invention showing the light source, the contact lens whose cross-sectional image is being projected and the transparent cell holding said contact lens, the representation illustrating the relation of these elements to the elements of the optical projection system employed.

Referring now to the drawing, the light source employed which is one of the types commonly used in slide projection systems is identified by reference numeral 1. The light rays from the source are directed through a condenser lens system consisting of plano-convex lens element 2 and converging bi-convex lenses 3 and 4. The light emerging from lens 4 is then passed through diffuser plate 5. The light rays then pass through a transparent cell 6 containing a soft contact lens 7 immersed in isotonic saline solution 8. The provision in the system of an additional plus or converging lens 3 brings the light focus or image of the source filament 9 much closer to cell 6 as shown.

When the light is then passed through the usual projection lens system, generally indicated by reference numeral 10 and focussed on projection screen 11, a very clear sharp cross-sectional image of contact lens 7 is observed in which both the posterior and anterior curves of the lens are clearly visible, dimensionally proportional to the actual lens curves, and readily measurable. Diameter and thickness can also be measured directly from the image. A typical projection lens system 10 for use in the system described is the Nikon Model 71,024 projection lens available from Nikon, Inc., Garden City, N.Y. 11,530.

Dimensional asymmetry and edge shape can also be detected by viewing the cross-sectional image of the lens.

We claim:

1. An optical projection system for viewing the contours of a transparent hydrophilic contact lens on a projection screen comprising a broad area light source and a projection screen, a transparent cell between the light source and the projection screen containing isotonic saline in which the transparent hydrophilic contact lens is immersed, a condenser lens system consisting of a plano-convex lens element and a biconvex lens between which an additional biconvex lens is placed, a light diffuser between the transparent cell and the condenser lens system whereby the light from said broad area light source is directed through the transparent cell, and a projection lens system between the cell and the screen for directing the light transmitted through the condenser lens system, the diffuser, the isotonic saline and the contact lens on to the screen.

\* \* \* \* \*